C. F. SPEIDEL.
CAMERA BACK.
APPLICATION FILED SEPT. 21, 1915.
1,217,653.
Patented Feb. 27, 1917.
2 SHEETS—SHEET 1.
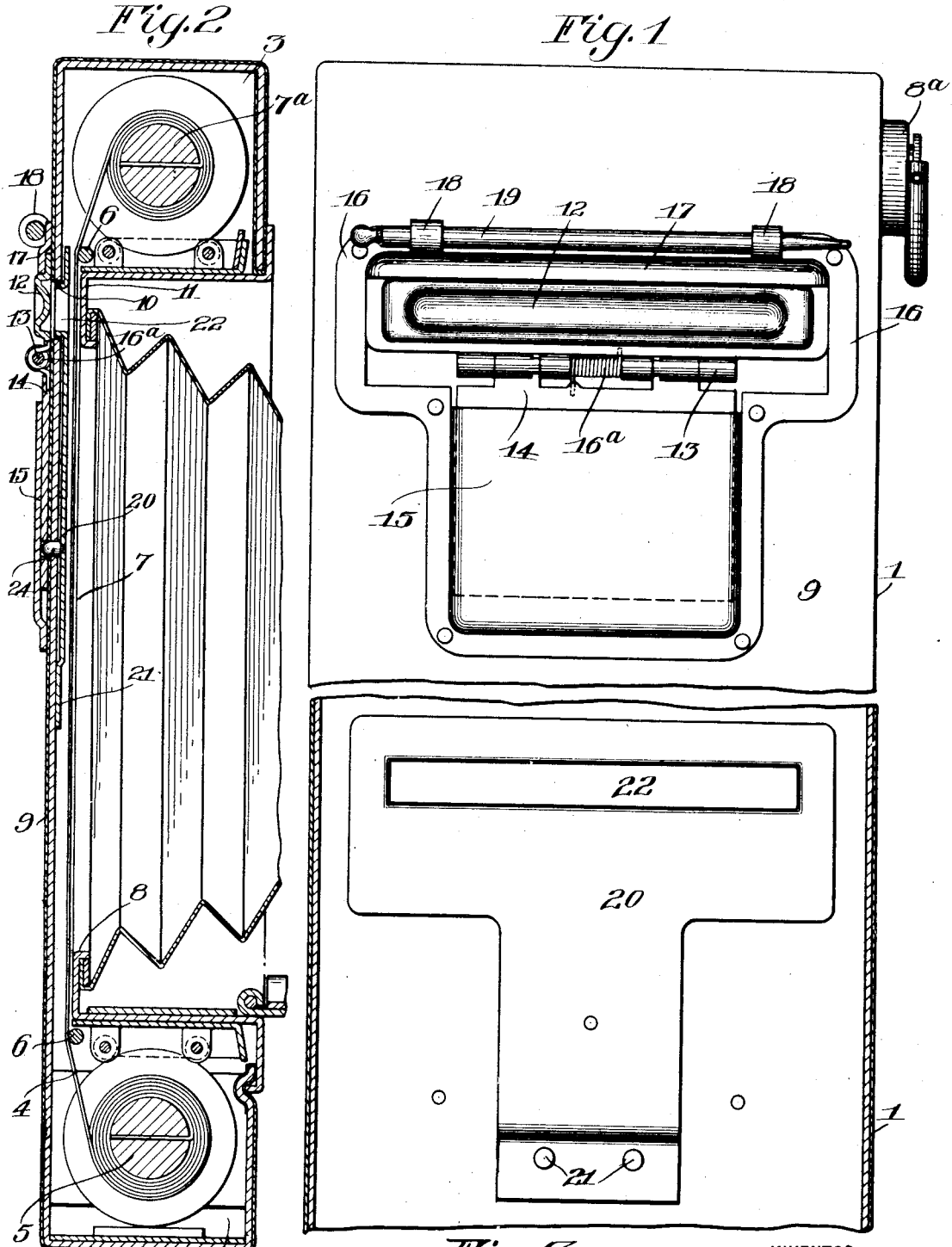
INVENTOR
Charles F. Speidel
BY
His ATTORNEYS

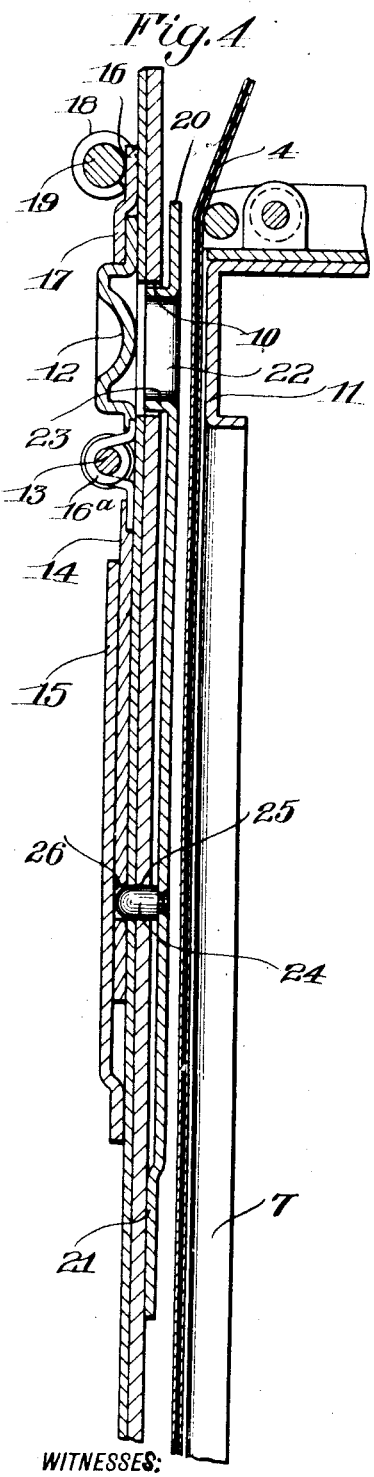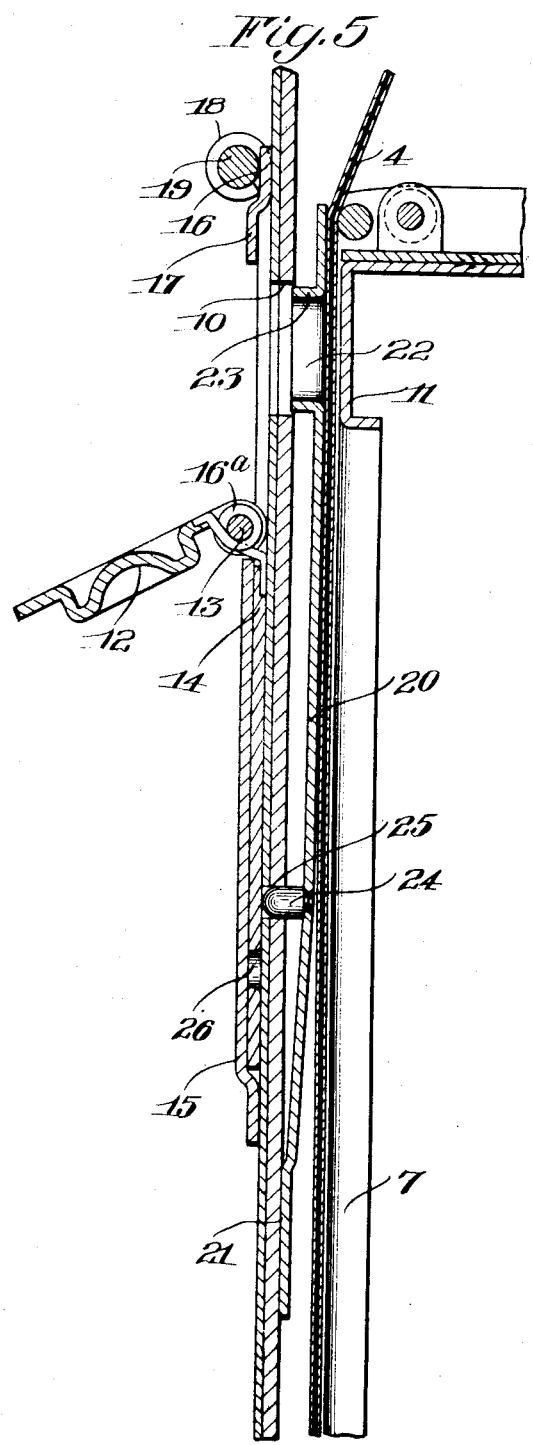

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

CAMERA-BACK.

1,217,653.   Specification of Letters Patent.   Patented Feb. 27, 1917.

Application filed September 21, 1915. Serial No. 51,759.

*To all whom it may concern:*

Be it known that I, CHARLES F. SPEIDEL, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras or roll holders in which the film or other sensitized material is made accessible from the exterior of the camera for marking and light printing suitable distinguishing characters thereon in connection with each exposure that is made. Access is had through a door usually placed at the back of the camera so that the inscribing is done in rear of the sensitive material and it is an object of my invention to provide an improved form of door in connection with a camera back which will be simple in construction and convenient to manipulate and will efficiently perform such other functions as have come to be required in this connection. To these and other ends the invention resides in certain improvements and combinations of parts all as will be hereinafter more fully described, the novel features being pointed out in the claims at the end of the specification.

In the drawings;

Figure 1 is a rear elevation of a portion of a camera back showing in plan a door constructed in accordance with and illustrating one embodiment of my invention;

Fig. 2 is a central vertical section through a roll holding camera and through the door applied to the back thereof;

Fig. 3 is an elevation of a portion of the front side of the camera back adjacent to the opening that is closed by the door, and Figs. 4 and 5 are fragmentary enlarged sections through the back and adjacent portions of the camera showing the door and other parts in different positions.

Similar reference numerals throughout the several figures indicate the same parts.

Cameras of the present type have been styled "autographic" cameras and their general mode of operation is too well known to require extended description. Referring more particularly to Fig. 2, the camera or roll holder shown comprises a body 1 having film spool chambers 2 and 3 at opposite ends thereof. The sensitive film strip 4 is fed from a supply spool 5 in the chamber 2 over guide rollers 6 past an intermediate exposure opening 7 within a frame 8 onto a winding roll 7$^a$ in the chamber 3 which is turned by a key 8$^a$, as usual. In the back 9 of the body 1 an elongated opening 10 is formed which runs transversely of the film strip and is opposite a table 11 formed by one side of the frame 8, which table is in front of the film. Through the opening 10 a pencil or stylus or other instrument may be inserted to write upon the film while against the table 11 in any one of a number of ways which, it is thought, need not be further identified herein. The marks or writings are light printed upon the sensitive material 4, usually by exposure from the same opening 10 through which they are made.

This opening 10 must, of course, be normally closed to the entrance of light and in the practice of my invention I provide it with a door 12 that is pivoted at 13 to a sliding plate 14 guided in a cover plate 15 secured to the back of the camera on the outside and having an extension 16 surrounding the opening 10. A spring 16$^a$ coiled about the pivot 13 of the door tends to hold it open in the position shown in Fig. 5 while to hold it closed, a retaining flange 17 formed by offsetting the extension 16 on the far side of the opening allows the free edge of the door to be shoved beneath it by sliding the plate 14 in that direction and carrying the door and its pivot bodily across the opening. The extension 16 may also have brackets 18 for holding the stylus 19 with which the writing is done.

In order to hold the film flat against the table 11, while being written upon and also to mask off adjacent portions from being fogged by the light admitted to the recording surface, a spring presser plate 20 is employed which may be secured to the back at 21 on the inside thereof, as shown. The movable end of this plate has an opening 22 in register with the opening 10 and a surrounding collar 23 that occupies the margins of the opening. Except when the writing is being done, the presser plate holds itself close against the back as shown in Figs. 2 and 4, out of contact with the film and allowing the free passage of the latter past the exposure opening 7. When, however, the writing is to be done, the presser plate is pressed inwardly to engage the film and hold it close against the table 11. It is preferable that this be done instantly and automatically with the opening of the door 12 or just before it is opened to effectively block off the light. To these ends, it is provided with a rounded projection 24 that operates through an opening 25 and normally rests within a recess 26 in the sliding plate 14 when the presser plate is out of action. As soon, however, as the plate 14 is moved back to release the door 12 from beneath the retaining flange 17, the solid portions of the plate 14 ride against the rounded end of the projection 24 and thrust it inwardly, as shown in Fig. 5, which brings the presser plate down against the film into operative position. With the return of the parts, the projection 24 resumes its position in the opening 26 and allows the presser plate 20 to draw back to the normal position of Fig. 4, releasing the film.

As it takes a considerable movement of the sliding plate 14 to release the door 12 from the retaining flange 17, it will be observed that the presser plate is assured its operative position before the door can fly open under the influence of its spring 16ª.

I claim as my invention:

1. The combination with a camera wall having an opening therein for marking the sensitive material and a clamping member for the latter on the inner side of the wall adjacent the opening, of a cover for said opening having a combined sliding and pivotal movement and operatively connected to the clamping member to actuate the latter during its sliding movement.

2. The combination with a camera wall having an opening therein for marking the sensitive material and a retaining device thereon, of a cover plate on the wall, a plate slidable beneath the cover plate and a cover hinged to the plate to close the opening, said cover being adapted to be held closed by the retaining member and to be engaged and released therefrom by the sliding movement of the plate.

3. The combination with a camera wall having an opening therein for marking the sensitive material and a retaining device thereon and a clamping member for the sensitive material on the inner side of the wall adjacent to the opening, of a projection on the clamping member extending through the camera wall, a sliding plate on the outer side of the wall having a portion adapted to engage the projection on the clamping member and move the latter toward the sensitive material and a cover hinged to the plate to close the opening, said cover being adapted to be held closed by the retaining member and to be released therefrom by the said sliding movement of the plate.

CHARLES F. SPEIDEL.

Witnesses:
M. JOSEPH SULLIVAN,
FRANK M. PAGE.